(12) United States Patent
Aguren

(10) Patent No.: US 8,233,804 B2
(45) Date of Patent: Jul. 31, 2012

(54) FIBER OPTIC CABLE DIAGNOSTICS USING DIGITAL MODULATION

(75) Inventor: Jerry G. Aguren, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

(21) Appl. No.: 12/241,945

(22) Filed: Sep. 30, 2008

(65) Prior Publication Data
US 2010/0080554 A1    Apr. 1, 2010

(51) Int. Cl.
*H04B 10/00* (2006.01)

(52) U.S. Cl. ............ 398/115; 398/135; 398/30; 398/31; 398/138; 340/10.1; 340/572.1; 340/572.4; 235/375; 235/451

(58) Field of Classification Search ............ 398/20, 398/115, 135–139, 30, 31; 370/277, 285, 370/328, 334; 340/10.1, 572.1, 572.4, 815.45; 235/375, 472.02, 435, 381, 385, 451, 492; 455/41.1, 78, 100, 422.1, 437, 41.2, 550.1, 455/558; 385/24, 101

See application file for complete search history.

(56) References Cited

U.S. PATENT DOCUMENTS

| | | | |
|---|---|---|---|
| 6,817,522 B2 | 11/2004 | Brignone et al. | |
| 6,968,994 B1 | 11/2005 | Ashwood Smith | |
| 7,380,714 B2 * | 6/2008 | Jusas et al. | 235/451 |
| 7,436,303 B2 | 10/2008 | Tourrilhes et al. | |
| 7,468,669 B1 * | 12/2008 | Beck et al. | 340/572.1 |
| 7,547,150 B2 * | 6/2009 | Downie et al. | 385/92 |
| 7,757,936 B2 * | 7/2010 | Aguren et al. | 235/375 |
| 7,760,094 B1 * | 7/2010 | Kozischek et al. | 340/572.1 |
| 7,772,975 B2 * | 8/2010 | Downie et al. | 340/572.1 |
| 7,782,202 B2 * | 8/2010 | Downie et al. | 340/572.1 |
| 7,792,425 B2 * | 9/2010 | Aronson et al. | 398/30 |
| 7,965,186 B2 * | 6/2011 | Downie et al. | 340/572.1 |
| 2005/0232635 A1 | 10/2005 | Aronson et al. | |
| 2006/0165039 A1 | 7/2006 | Lyon et al. | |
| 2007/0221730 A1 | 9/2007 | McReynolds et al. | |
| 2007/0250410 A1 | 10/2007 | Brignone et al. | |
| 2008/0240724 A1 * | 10/2008 | Aguren | 398/139 |
| 2010/0052856 A1 * | 3/2010 | Macauley et al. | 340/10.1 |
| 2012/0019366 A1 * | 1/2012 | Aguren | 340/10.1 |

* cited by examiner

*Primary Examiner* — Loha Ben

(57) ABSTRACT

Embodiments are directed to fiber optic cable diagnostics using digital modulation. A contact of a RFID (radio frequency identification) device located in a cable is connected with a contact of an optical transceiver. Data through the cable is using digital modulation and monitored to determine if the fiber optic cable and the optical transceiver are properly functioning.

20 Claims, 5 Drawing Sheets

FIBER OPTIC CABLE DIAGNOSTICS USING DIGITAL MODULATION

RELATED AND CO-PENDING APPLICATIONS

This application is related to application having Ser. No. 11/830,922 entitled "System and Method for Cable Monitoring" and filed on Jul. 31, 2007, now U.S. Pat. No. 7,757,936, entitled "System and Method for Cable Monitoring" and filed on Mar. 26, 2007, both of which are incorporated herein by reference. This Application claims the benefit of U.S. Provisional Application Ser. No. 61/040,649, filed Mar. 29, 2008, titled "Fiber Optic Cable Diagnostics Using Digital Modulation" which is hereby incorporated by reference herein as if reproduced in full below.

BACKGROUND

Data centers house large numbers of electronic equipment, such as computers and storage devices. Such data centers can span from a single room to multiple floors of an entire building. Servers are often stacked in rack cabinets that are placed in rows forming corridors so technicians can access the rear of each cabinet. Mainframe computers and other storage devices are often placed near the servers and can occupy spaces as large as the racks themselves.

Data centers and other networking-infrastructures have enormous numbers of cable and wires connecting various electronic equipment. Even though such facilities are highly organized, the number of cables interconnecting such equipment can be overwhelming. Installing, maintaining, and tracking cables and connections to equipment can be complex. For instance, technicians need to know which cable connects to which piece of equipment. Further, if a cable becomes degraded or experiences a critical failure, then this cable needs to be readily identified.

In order to effectively manage a data center or other facility with large amounts of electronic equipment, sufficient information about cables, connections, and electronic equipment is required.

DETAILED DESCRIPTION

Figure 1A:
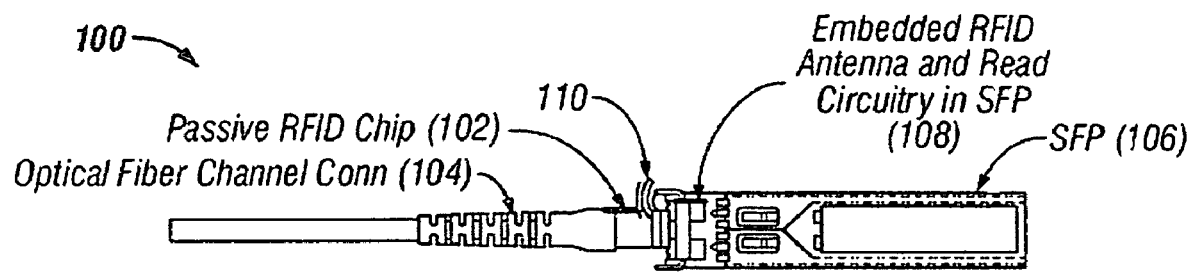
FIG. 1A is a block diagram showing an RFID tag mounted in a cable connector with an embedded RFID reader in accordance with an exemplary embodiment.

Embodiments in accordance with the present invention are directed to apparatus, systems, and methods for real-time monitoring of optical fiber cables in a data center. One embodiment embeds a passive Radio Frequency Identification (RFID) reader into an optical transceiver, such as SFP/SFF (Small Form factor Pluggable/Small Form Factor) optical transceivers. One purpose is to read data that is stored in a RFID tag located in one end of the cable. The tag is read when the cable is plugged into the optical transceiver. Data read from the cable is combined with optical transceiver data and then passed on to a centralized algorithm, that determines the operational status of both the optical transceiver and cable. The algorithm determines the status of the SFPs and cable subsystem (for example, two SFPs connected at opposite ends of the cable).

In one embodiment, the communication channel between the two SFPs that are connected by a fiber optic link is used by one or more of the SFP, the electronic device that the SFPs are operating, applications in the electronic device in which the SFP is operating, and applications outside the electronic device.

One embodiment monitors and diagnoses optical systems (for example, optical systems in a data center). Data is transmitted over the optical fiber using digital modulation. By way of example, Amplitude-shift keying (ASK) is a form of modulation that represents digital data as variations in the amplitude of a carrier wave. The amplitude of an analog carrier signal varies in accordance with the bit stream (modulating signal), keeping frequency and phase constant. The level of amplitude is used to represent binary logic 0s and 1s (i.e., the carrier signal is analogous to an ON or OFF switch). In the modulated signal, logic 0 is represented by the absence of a carrier, thus giving OFF/ON keying operation and hence the name given.

When designing a physical layer diagnostic and monitoring system, exemplary embodiments determine operational characteristics of all the components being monitored. The characteristics are used to develop models that can predict a specific output for a given input. The models are used to compare a predicted attenuation of the laser power through an optical fiber to the measured receive optical power. A RFID tag mounted in the connector of the cable contains a set of physical cable parameters that are used by a central algorithm to calculate attenuation through the fiber. The differences between the calculated and measured data are then used to determine if a cable subsystem is in a good, failed, or degraded state.

In one embodiment, the physical system that is monitored consists of a fiber optic cable and two optical transceivers at each end of the cable. The industry standard for optical transceivers in data centers supporting Fibre Channel Storage Area Networks (SAN) is the Small Form-factor Pluggable (SFP) transceiver. A SFP when placed into a device becomes the port. Since the RFID antenna is integrated into the SFP, the port's ability to read a cable's RFID tag is directly coupled to the SFP and not the device the SFP is located.

In one embodiment, dual path RFID tags are used. A physical connection between contacts in the cable and SFP enables data exchange without using an antenna. An RFID antenna embedded in the SFP is not required to read data from the cable. Instead, an electrical contact in the cable physically touches an electrical contact in the optical transceiver to establish an electrical pathway for transmitting data.

Data collected in the exchange between the cable and optical transceiver is provided to a central algorithm that determines the operational status of the cable and optical transceivers at both ends of the cable. By way of example, operational status conditions include, but are not limited to: broken connection in the cable subsystem, broken fiber (two fibers per cable), degraded cable failed Laser TX1 & TX2, failed PIN diode RX1 & RX2, low received signal RX1 & RX2, marginal received signal RX1 & RX2, removed connector (from SFP cage), predictive laser failure, data rate length violation (i.e. OM2@8 Gbs-50 m), and cable connector not fully inserted into optical transceiver.

The data collected or read in the exchange between the cable and optical transceiver includes a variety of different types of information. By way of example, this data includes, but is not limited to, one or more of the following SFP variables: manufacturer, serial number, customer identification number, manufactured data (day, month, year), transmission optical power (for example, in mill-watts), laser current (for example, in amps), laser wavelength (for example, in nanometers), laser type, receive optical power (for example, in milliwatts), temperature of optical transceiver, part number, control (for example, communication channel, OTDR, external communication), status (for example, status of SFP communication channel), transmission buffer (for example, external serial transmission), and receive buffer (for example, external serial transmission). By way of further example, this data includes, but is not limited to, one or more of the following cable (RFID) variables: manufacturer, serial number (for example, a unique number for all cables with a last bit used to denote the cable end), customer identification number, cable length, cable type (for example, one of OM1, OM2, SM, OTDR1, OTDR2, OTDR3, or OTDRSM), connector A type, connector B type, and cable condition (for example, good, failed, damaged or partially plugged).

Exemplary embodiments provide real time monitoring and diagnostic framework that is used in optical and copper based networks. Using industry standard protocols, such as SMI-S and SNMP, optical transceiver and cable data are systemically collected across a location, such as a data center. Data is processed at relatively real time rates, where the cable and SFP's operational condition are specified in one of three states: good, failed, or degraded. Thus, cables and optical transceivers are monitored while they are operating to transmit and receive data.

After the state of all monitored cables and SFPs are calculated, the user is presented (for example, in a display) with a concise topology map of their data center with visual indicators showing the status of all SFPs and optical cables. Exemplary embodiments offer the customer an unique opportunity to monitor the status of all physical links in their data center.

One embodiment includes a data center having multiple cable subsystems. A basic subsystem consists of a cable with two fibers, two connectors, two optical transceivers (SFPs), and two devices (can be either a Switch, HBA, or Storage) in which the SFPs are plugged. Each subsystem is monitored individually so a user can determine the health or state of each separate subsystem in the data center. In one embodiment, an RFID tag is used to store cable data. If the RFID tag is passive (i.e., not using a battery), the power is obtained from the RFID reader's transmission signal.

One embodiment monitors and diagnoses optical systems in a data center using a low bandwidth digital communication channel that is created between two optical transceivers. A small percentage of the amplitude of the data signal is used to create the low bandwidth channel. Information transmitted between the optical transceivers is collected and transmitted to a management server. The information is used, for example, to manage, alter, or optimize laser power transmitted between the optical transceivers.

One embodiment continuously monitors all optical systems in a data center. Each optical subsystem is given a status of good, degraded, or failed. For degraded conditions, the cable can be diagnosed under normal operation. In addition, when cables contain RFID tags and the SFPs have the capability to read the cable's RFID, the SFP laser power can be optimized for the cable length.

In one exemplary embodiment, a communication channel between two optical transceivers exchanges operational information about each optical transceiver to the other optical transceiver (example, between two SFPs). This information includes, but is not limited to laser optical power, laser current, PIN diode current, and case temperature. The data is passed to a device in which the optical transceiver is mounted (example, HBA, switch, or storage controller). Then using industry standard protocols, for example SMI-S and SNMP, the SFP data is transmitted to a central server for analysis.

One embodiment calculates the operational condition of an optical fiber cable during use or operation (i.e., while data is being transmitted along or through the cable). The method is adaptive and determines a status of a cable and laser power being transmitted along an optical fiber. This status can be determined using a minimal set of data acquired from only one end of a SFP (Small Form-factor Pluggable). The status can also be determined using much more information, such as a comprehensive set of system information that includes SFP transceiver and embedded RFID (Radio Frequency Identification) tag data acquired at both ends of a cable.

One exemplary embodiment requires a minimal of one side of an optical fiber cable to have a RFID reader and cable with RFID tags or transmitters. Information from the RFID tag along with data from the SFP provides data for in-depth and real-time monitoring, diagnosing, and managing of the cable connection system. Embodiments can operate with input from only one side of the cable or input from the SFP and RFID tag on both sides of a connector. In one embodiment, the SFPs periodically transmit data back and forth to each other. Thus, at any given time, each SFP has data concerning itself and the other SFP. Data concerning both SFPs can be transmitted from only one SFP to a server or management application. In one embodiment, a central management application periodically polls the data. For example, the management application periodically (example, at predetermined intervals) monitors or queries the system to retrieve data from one of the optical transceivers.

One exemplary embodiment is a cable management system that includes one or more of four components: RFID tag, RFID reader, optical transceiver, and an algorithm. RFID tags are placed in or near the connectors located at each end of a fiber optic cable. One or more RFID readers are included, for instance one handheld RFID reader and one or more RFID readers embedded into SFP/SFF (Small Form factor Pluggable/Small Form Factor) optical transceivers. The final component is an algorithm that processes information collected from RFID tags and transceivers. In one exemplary embodiment, the status is presented to a user (example, as a report or output to a display) and provides an indication if a cable, laser, or other devices are properly or normally operating, operating in a degraded state, or failed.

Exemplary embodiments enable IT (Information Technology) professionals the ability to instantaneously monitor the operational status of every cable in a data center or other computing or storage environment. Specifically, embodiments provide a framework that enables real-time cable monitoring, rapid diagnostics, accurate topology maps, and cable inventory generation of operational cables and cables in storage.

The discussion of exemplary embodiments is divided into multiple sections below. These sections include RFID tags, RFID readers, embedded RFID readers, and monitoring and diagnostic algorithms and systems.

RFID Tags

RFID tags or identification devices provide information to manage cables in a data center or other environment with electronic equipment. This information includes a unique identifier or serial number in both connectors at each end of the cable. Moreover, the RFID tag contains detail cable parameters that are used by the monitoring and diagnostic algorithms and systems to determine the condition of the cable and the signal propagating down it.

RFID tags can be divided into two groups: active and passive. Active tags contain an energy source that allows the tag to continuously broadcast its signal. Passive tags do not have any power source, but instead depend on borrowing some of the energy in the incoming signal to power its own circuitry and to vary antenna load as seen by the RFID reader.

One exemplary embodiment utilizes the passive circuit in the cable management system because of cost and size issues. For instance, small current passive RFIDs are positioned into connectors of the optical fiber cables.

RFID Readers

RFID readers can be utilized in exemplary embodiments in accordance with the present invention. A portable handheld reader, for instance, can have a working distance (i.e., the distance that reader can be energized to read tags) on the order of several meters.

The reader has two primary functions: tracing cable and conducting inventory. Many data centers or customer sites do not label the cables. Finding the end of a cable can be difficult, especially if there is an optical patch panel used at the facility. The handheld reader is used to store the unique serial number read from the tag in one connector. Then, by going to the patch panel or switch where the other end of the cable is suspected, the handheld reader is waved over the cable connectors. If a match to the RFID tag is found, the handheld reader makes a beep or a visual sign to notify the user that the connector has been found.

The next function is conducting inventory. This process includes both operational and non-operational cables. Non operational cables are cables not used in the system. They can be in boxes or bags and stored in cabinets. The handheld reader makes it easy to accurately capture the content of a RFID tag. The cable data stored in the reader is uploaded to a system management application for report generation. If an optical patch panel is used or if there are HBAs (Host Bus Adapters) or SFPs without embedded readers, then the handheld reader collects data and uploads this data to the system management application.

The RFID readers can be located in a variety of devices or physical locations. By way of example, in one embodiment the RFID reader is located in a portable or handheld electronic device. In other embodiments, the RFID reader is fixed or located in larger electronic devices or equipment (such as in a computer or equipment rack, a door opening in RFID warehousing applications, optical patch panels, etc.).

Embedded RFID Readers

In order to monitor and diagnose cables in operation, exemplary embodiments utilize methods and systems to automatically read the RFID tag at one or both ends of the cable. In one embodiment, the RFID reader is embedded in one or more of a SFP and/or SFF.

FIG. 1A is a block diagram 100 showing how a RFID tag 102 mounted in an optical fiber cable connector 104 is read by an SFP 106 with an embedded RFID reader 108 that includes an antenna and read circuitry. Exemplary embodiments are thus able to monitor and diagnose a cable and SFP while the cable and SFP are operating (i.e., transmitting data). The semicircles 110 emanating from the RFID reader 108 represent radio waves from the reader to the RFID tag 102.

Figure 1B:
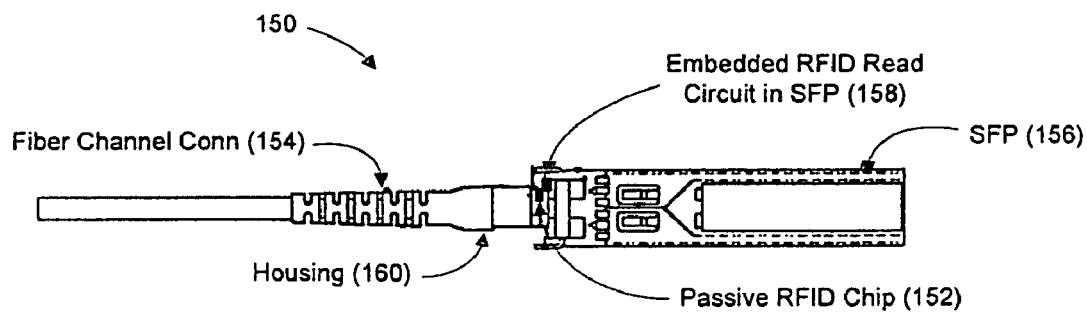
FIG. 1B is a block diagram showing an RFID tag mounted in a cable connector with an embedded RFID reader in accordance with an exemplary embodiment.

FIG. 1B is a block diagram 150 showing how a RFID tag 152 mounted to an external surface or housing 160 of an optical fiber cable connector 154 is read by an SFP 156 with an embedded RFID reader 158 that includes read circuitry without an antenna. When the cable is correctly and completely inserted in the end of the optical transceiver, the RFID chip or tag 152 physically contacts or connects to an electrical connector or RFID read circuit 158. This physical contact between the tag 152 and SFP 156 establishes a communication or conductive pathway between the cable and optical transceiver for the exchange and transmission of data. This exchange occurs while the cable is active. Thus, exemplary embodiments are able to monitor and diagnose a cable and SFP while the cable and SFP are operating (i.e., transmitting data).

In one exemplary embodiment, the RFID tag contains a unique serial number for identifying both ends of the cable. The serial number is large enough to not have repeating numbers in the lifetime of cable manufacturing. In addition to the serial number, the manufacturer, length, connector type, and the physical parameters of the cable are included as well. Further, in one embodiment, data can be written to the RFID tag such that state information can stay with the cable when it is moved.

Various applications can be utilized with exemplary embodiments to support data collection across a data center using standards protocols such as SNMP (Simple Network Management Protocol) and SMI-S (Storage Management Initiative-Specification). In order to support reading SFP or RFID, data extensions are used to both SNMP and SMI-S protocols that include the RFID data in the cable and the detail transmitter and receiver optical power, and laser current, laser type, and laser mode from the transceiver.

Monitoring and Diagnostic Algorithms and Systems

Figure 2:
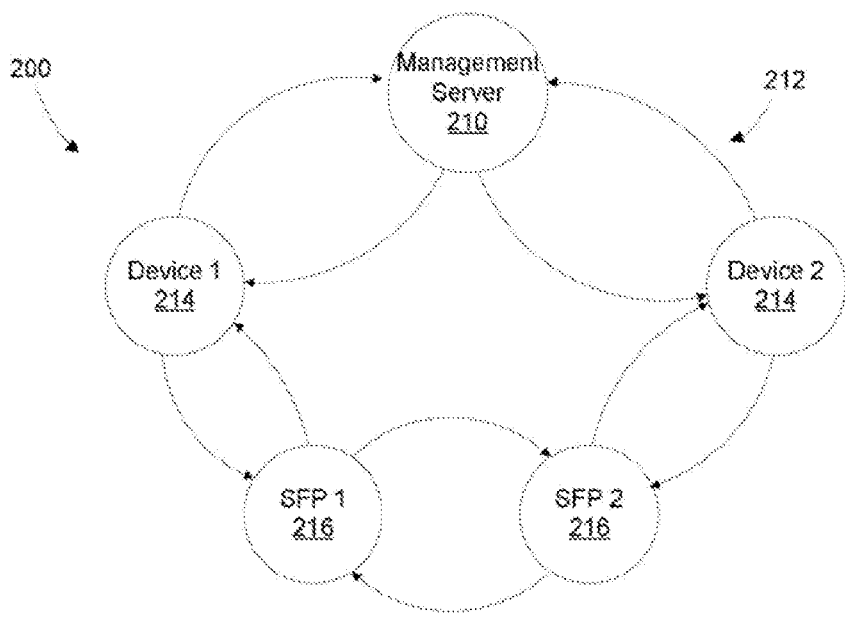
FIG. 2 is a diagram of cable management system in accordance with an exemplary embodiment.

FIG. 2 is a diagram of cable management system 200 in accordance with an exemplary embodiment. The system includes a management server 210 coupled through a network 212 to a plurality of devices 214 (shown as device 1 and device 2) and plurality of optical transceivers 216 (shown as SFP 1 and SFP 2). For convenience of illustration, only two devices 214 and two optical transceivers 216 are shown, but the system can include hundreds or thousands of such devices and transceivers.

Figure 3:
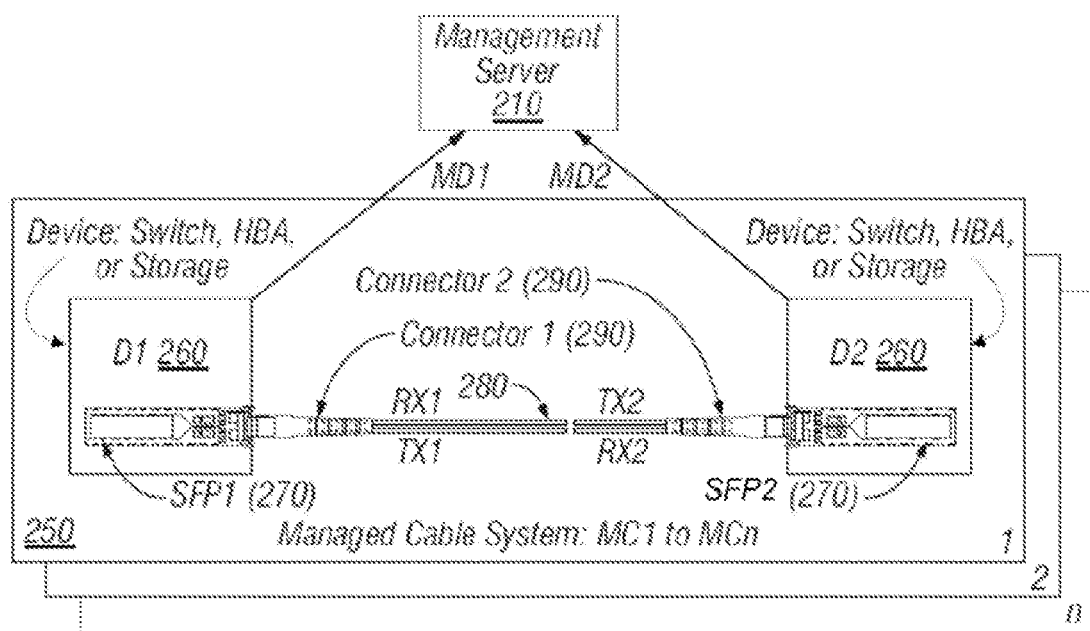
FIG. 3 is a block diagram of a cable management system in accordance with an exemplary embodiment.

FIG. 3 shows the cable management system with the management server 210 coupled to a plurality of managed cable systems 250 (shown as managed cable system MC1 to MCn). Each managed cable system 250 includes two devices 260 (labeled D1 and D2), two optical transceivers 270 (labeled SFP1 and SFP2), and an optical cable 280 extending between the optical transceivers. Connectors 290 (labeled as connector 1 and connector 2) are provided at ends of the cable 280 for attaching to the optical transceivers 270.

In one embodiment, a low bandwidth communication channel is created that is added to normal data transmitted through the fiber optic cable 280. A small percentage of the amplitude of the data signal is used to create a low bandwidth channel. Each SFP 270 periodically transmits data about its laser and PIN diode status to the other SFP using this channel. Each SFP adds to the other SFP's information to its internal diagnostic E2PROM. This information is then extracted by devices 260 (shown as D1 and D2). The devices include, but are not limited to a switch, HBA, or storage component (example, disk array, tape device, virtual tape device, etc.).

The devices 260 transmit the SFPs information (labeled as MD1 and MD2) back to a server 210. One embodiment provides for continuous monitoring of an optical link between the two SFPs during normal operation, and the ability to get information in real-time about both SFPs from only one side of the cable (i.e., from only one of the SFPs).

One embodiment creates a communication channel between two optical transceivers (SFPs) in each managed cable system. The communication channel is then used to exchange operational information about each SFP to the other SFP. SFP information includes, but is not limited, to laser optical power, laser current, PIN diode current, and case temperature. In one embodiment, the SFP status is stored in internal E2PROM and based on industry standard, "Digital Diagnostic Monitoring Interface for Optical Transceivers: SFF-8472". The data is then passed to the device in which the SFP is mounted (HBA, switch, or storage controller). Then using industry standard protocols, for example SMI-S and SNMP the SFP, the data is collected at the management server for analysis.

In some instances, the data or information transmitted to the management server is available from both devices containing SFP1 and SFP2. Alternatively, the monitoring channel provides a mechanism to have information from both SFPs collected from a single device.

In one exemplary embodiment, the signal strength along the fiber cable is matched with a physical length of the cable. For example, typically the laser diode is driven at a maximum power for an assumed maximum cable length. In other words, the laser diode is preset for a maximum allowed cable length (example, 100 meters). The actual length of the cable, however, extending between two SFPs can be much smaller than the maximum allowed cable length. A data center, for instance, can have many fiber optical cables less than ten meters. In this instance, the power through the cables may be overdriving the laser diode (example, overdriving the PIN diode).

In one exemplary embodiment, the system determines the exact length of the cable between the two SFPs. The signal strength from the laser diode is then modified (example, reduced, increased, or otherwise adjusted) to accommodate the specific length of the cable. For instance, instead of driving the laser diode at maximum power, the power is reduced in accordance with the actual length of the cable. The SFP information is thus used to tailor or alter the optical output of the cable to match a length of the cable (including splices, connectors, etc. existing between the two SFPs). As such, the PIN diode is not overdriven. The RFID provides the cable length. When RFID data is not available, then only the attenuation of the laser signal, which is read from the other SFP's PIN (photodiode) is used. The method would start with the laser power at maximum power the slowly step the power down until a typical power level is read at the PIN diode.

Exemplary embodiments are also applicable when information is received at only one of the SFPs. For example, since cables transmit in both directions, SFP 1 receives RX1 and transmits TX1. Likewise, SFP 2 receives RX2 and transmits TX2. If a high level of monitoring is not available, then the system may only have information regarding one of the SFPs (example, only TX1 and RX2 or only TX2 and RX1). The information from a single SFP can be used to control the laser diode output power and perform diagnostics in accordance with exemplary embodiments.

Figure 4:
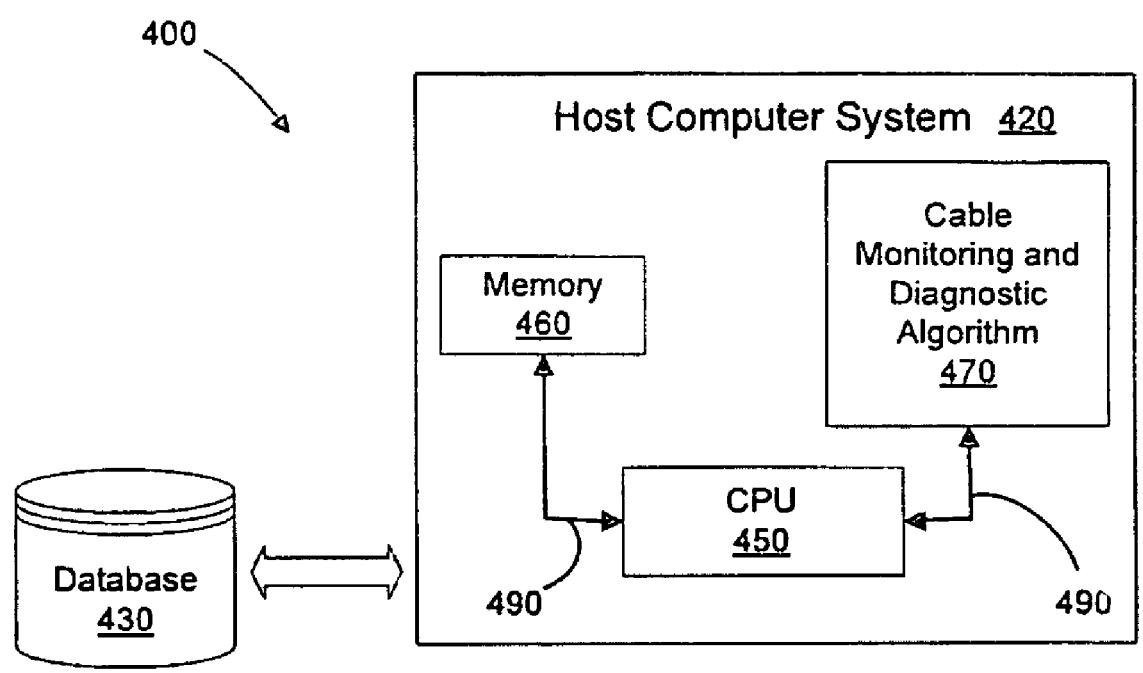
FIG. 4 shows an exemplary computer system in accordance with an exemplary embodiment.
Figure 5:
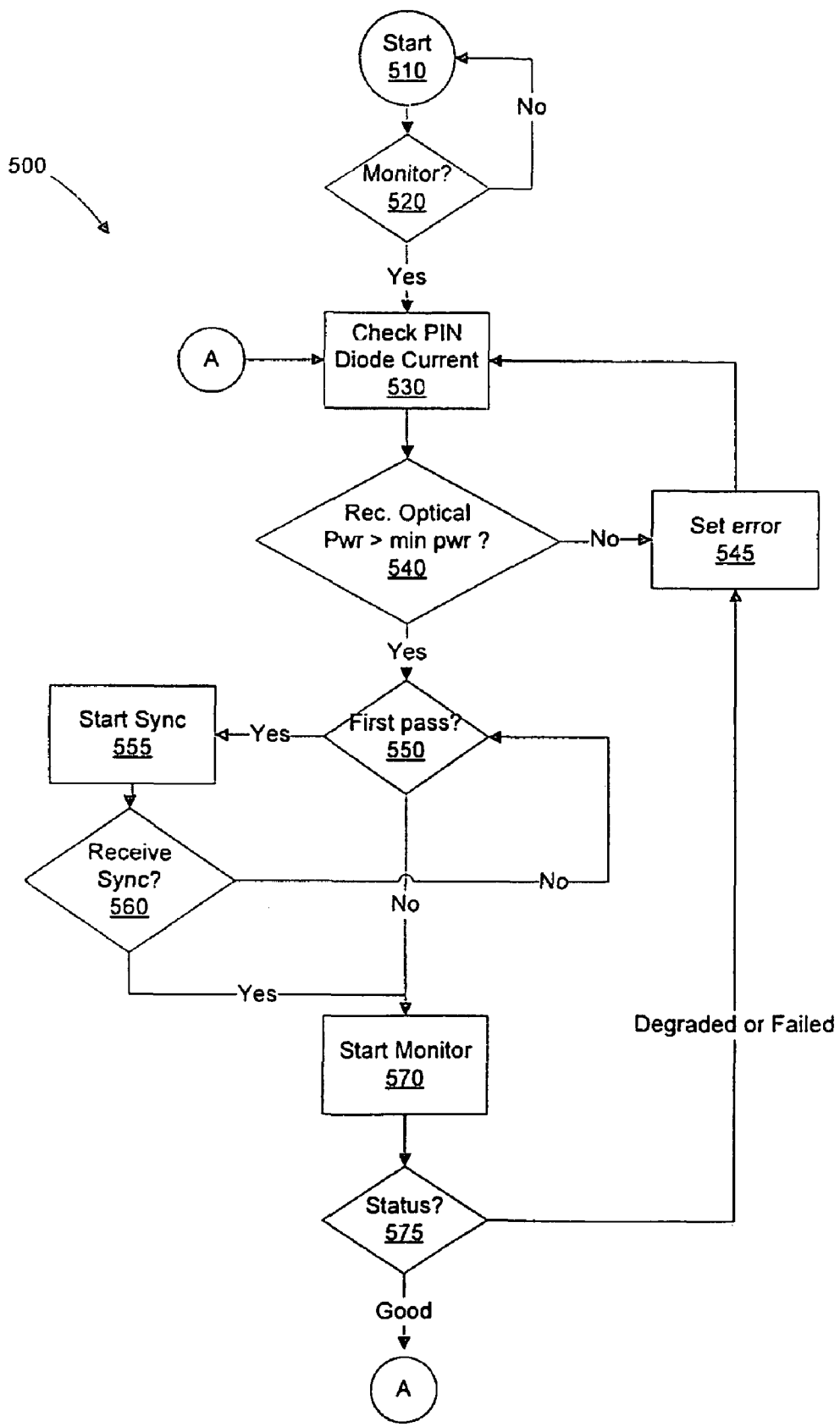
FIG. 5 is a flow diagram in accordance with an exemplary embodiment.

FIG. 4 illustrates an exemplary system 400 for calculating the operational condition of an optical fiber cable system during use in accordance with exemplary embodiments. The system 400 includes a host computer system 420 (such as a management server 210) and a repository, warehouse, or database 430. The host computer system 420 comprises a processing unit 450 (such as one or more processors of central processing units, CPUs) for controlling the overall operation of memory 460 (such as random access memory (RAM) for temporary data storage and read only memory (ROM) for permanent data storage) and a cable monitoring and diagnostic algorithm 470 for monitoring in real-time optical fiber cables during operation or use of the cables. The algorithm provides an estimation of the overall operation status of one or more specific cables. By way of illustration, such operation status includes good/normal, degraded, and/or failed. One embodiment of the cable monitoring and diagnostic algorithm 470 is provided in the flow diagram of FIG. 5.

The memory 460 stores data, control programs, and other data associate with the host computer system 420. In some embodiments, the memory 460 stores the cable monitoring and diagnostic algorithm 470. The processing unit 450 communicates with memory 460, data base 430, cable monitoring and diagnostic algorithm 470, and many other components via buses 490.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Initially, when the communication between SFPs is started, each SFP follows a sequence of states in order to determine if the other SFP is able to communicate and if there is enough margin in the received optical power to enable the communication channel. The flow diagram 500 of FIG. 5 identifies how the channel operation is verified.

Flow starts at 510 and proceeds to block 520 wherein a question is asked whether to monitor a created communication channel between the two SFPs. If the answer to this question is "yes" then flow proceeds to block 530.

The lock diagram illustrates an exemplary method to establish a reliable communication link between the two SFPs. The primary test is for the receive signal power to be above a safe value (i.e., a value having reliable data transmission).

At block 530, the photodiode current is checked (shown as PIN diode current). At block 540, a question is asked whether the recommended optical power is greater than a minimum required power. If the answer to this question is "no" then flow proceeds to block 545 and an error is set. If the answer to this question is "yes" then flow proceeds to block 550 and a question is asked as to whether this is a first pass.

If this is a first pass, then synchronization between the two SFPs commences as shown in block 555. At block 560, a question is asked as to whether synchronization is received. If the answer to this question is "no" then flow loops back to block 550. If the answer to this question is "yes" and synchronization between the SFPs exists, then flow proceeds to block 570 and monitoring commences along the communications channel.

According to block 575, a status of the managed cable system is determined. If the status is degraded or failed, then flow proceeds to block 545 and an error is set. In this instance, the error is recorded and notification output (example, notice output to a display, sent to a user, input to a report, etc.). If the status is good (example, no error conditions), then flow proceeds back to block 530.

In one exemplary embodiment, two SFPs in a managed cable system communicate with each other and this information is transmitted to a management server. In another embodiment, not only is there SFP to SFP communication, but there is facility for application to application communication as well.

In one embodiment, the RFID is embedded in ends of the cable connectors. For example, cable manufacturers create a void for a RFID tag. Cable manufacturers can then place the RFID in only the cables ordered with such a tag. This process of made-to-order tags minimizes manufacture assembly modification.

Figure 6B:
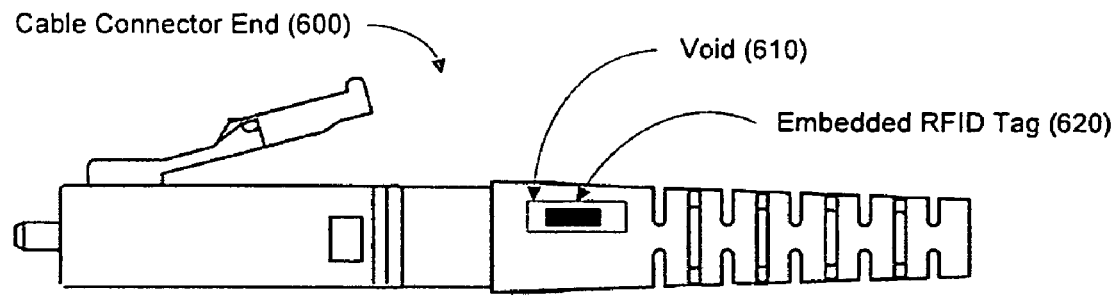
FIG. 6B shows an exemplary cable connector end having an external RFID tag in accordance with an exemplary embodiment.
Figure 6A:
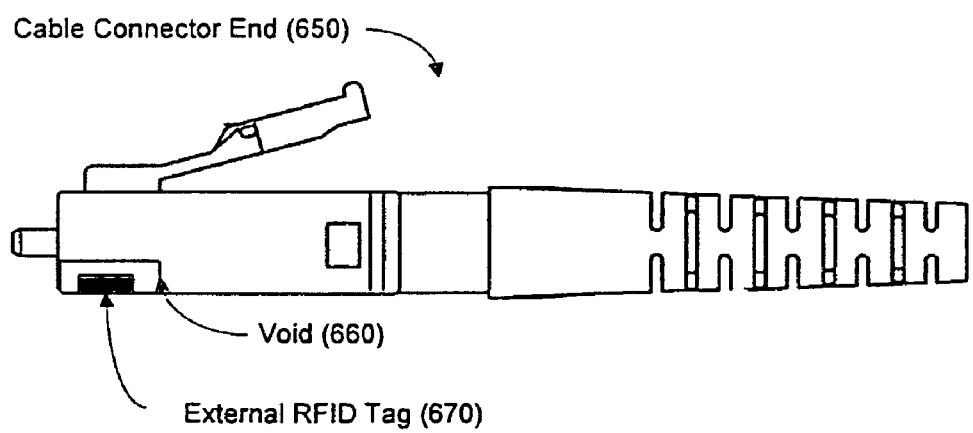
FIG. 6A shows an exemplary cable connector end having an internal RFID tag in accordance with an exemplary embodiment.

FIG. 6A shows an exemplary cable connector end 600 having void 610 for receiving an RFID tag 620. In one embodiment, the void is located completely inside a housing of the cable.

FIG. 6B shows an exemplary cable connector end 650 having void 660 for receiving an RFID tag 670. In one embodiment, the void is located on an exterior of a housing of the cable. In this embodiment, the RFID tag 670 is located on the exterior of the housing to enable physical contact with a contact in the optical transceiver.

Exemplary embodiments provide a unique method for SFP to SFP physical layer communication that occurs without affecting normal data transmission between the SFPs. This communication is the foundation for a holistic communication monitoring and diagnostic system for optical networks. In addition, facilities are provided to enable external applications to send commands from one SFP to another without affecting normal data transmission.

As used herein, the term "storage device" means any data storage device capable of storing data including, but not limited to, one or more of a disk array, a disk drive, a tape drive, optical drive, a SCSI device, or a optical fiber device. Further, as used herein an "SFP" or "small form-factor pluggable" is an optical transceiver used in optical communications for telecommunication and/or data communications. SFPs interface network devices to fiber optic cable.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, exemplary embodiments can be implemented with a wide variety of embodiments. By way of example, incorporated herein by reference is the patent application entitled "System and Method of Cable Monitoring" filed Mar. 26, 2007, having application Ser. No. 11/728,485, invented by Jerry G. Aguren.

Blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention. By way of example, exemplary embodiments can utilize one or more embodiments disclosed in U.S. Pat. No. 6,968,994 incorporated herein by reference.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
coupling a cable to an optical transceiver so that an electrical contact of a RFID (radio frequency identification) device on the cable physically contacts an electrical contact of the optical transceiver; and
transmitting data through the cable using digital modulation from the optical transceiver and the RFID device to determine an operational status of the cable.

2. The method of claim 1, wherein the electrical contact of the RFID device is located on an exterior surface of a housing of the cable.

3. The method of claim 1, wherein the electrical contact of the optical transceiver is completely embedded inside a housing of the optical transceiver.

4. The method of claim 1, wherein the operational status includes a degraded cable condition and a failed cable condition.

5. The method of claim 1 further comprising, using the data to determine when the cable is not fully inserted into the optical transceiver.

6. The method of claim 1 further comprising, monitoring the cable to receive the data while fiber optic transmissions are occurring through the cable and the optical transceiver.

7. The method of claim 1 further comprising, periodically polling the cable to receive new data from the optical transceiver and the RFID device.

8. A computer readable medium having instructions for causing a computer to execute a method, comprising:
monitoring a fiber optic cable that receives data transmitted using digital modulation from an optical transceiver, wherein a contact of a RFID (radio frequency identification) device located in the fiber optic cable connects to the optical transceiver to transmit the data; and diagnosing the data to determine if the fiber optic cable and the optical transceiver are properly functioning.

9. The computer readable medium of claim 8 further comprising, using the data to diagnose an optical network physical layer.

10. The computer readable medium of claim 8, wherein the data includes a serial number and operating temperature of the optical transceiver.

11. The computer readable medium of claim 8 further comprising, providing the data from the optical transceiver over a standard protocol that includes one of SNMP (Simple Network Management Protocol) and SMI-S (Storage Management Initiative-Specification).

12. The computer readable medium of claim 8 further comprising, collecting a first portion of the data through a first end of the fiber optic cable from the optical transceiver and a second portion of the data through a second end of the fiber optic cable from another optical transceiver.

13. The computer readable medium of claim 12 further comprising, storing the data at each of the two optical transceivers.

14. The computer readable medium of claim 8 further comprising, obtaining the data from a first RFID device located on an exterior housing at one end of the cable and a second RFID device located on an exterior housing at another end of the cable.

15. The computer readable medium of claim 8 further comprising, using the data to determine if the cable is operating in a degraded condition.

16. A computer system, comprising:

a memory storing an algorithm; and a processor executing the algorithm to:

receive data using digital modulation through a first contact of an optical transceiver connected to a second contact of a RFID (radio frequency identification) device located in a cable;

and use the data from the optical transceiver and the RFID device to determine if the cable is properly operating.

17. The computer system of claim 16, wherein the second contact is located on an exterior surface of the cable.

18. The computer system of claim 16, wherein the first contact of the optical transceiver is completely embedded inside a housing of the optical transceiver.

19. The computer system of claim 16, wherein the processor further executes the algorithm to use the data to determine when the cable is not fully inserted into the optical transceiver.

20. The computer system of claim 16, wherein the processor further executes the algorithm to use the data to determine when the cable includes a broken or damaged optical fiber.

* * * * *